United States Patent
Lee et al.

(10) Patent No.: US 8,894,956 B2
(45) Date of Patent: Nov. 25, 2014

(54) SULFUR DIOXIDE AND/OR SULFUR DIOXIDE HYDRATE ABSORBENT

(71) Applicant: Korea Institute of Science and Technology, Seoul (KR)

(72) Inventors: Hyun Joo Lee, Gyeonggi-do (KR); Seung Rok Lim, Gyeonggi-do (KR); Kean Im Lee, Seoul (KR); Chang Soo Kim, Daegu (KR); Hoon Sik Kim, Seoul (KR); Ji Sik Choi, Seoul (KR); Sang Deuk Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 14/087,373

(22) Filed: Nov. 22, 2013

(65) Prior Publication Data
US 2014/0294718 A1    Oct. 2, 2014

(30) Foreign Application Priority Data

Mar. 29, 2013 (KR) .......... 10-2013-0034594
Apr. 1, 2013 (KR) .......... 10-2013-0035431

(51) Int. Cl.
C09K 3/00    (2006.01)
B01D 53/50    (2006.01)
B01D 53/14    (2006.01)

(52) U.S. Cl.
CPC ........ B01D 53/1493 (2013.01); B01D 53/1481 (2013.01)
USPC .......... 423/242.2; 423/242.7; 423/244.02; 252/184; 252/189; 252/190

(58) Field of Classification Search
USPC ........... 252/184, 189, 190; 423/242.2, 242.7, 423/244.02
See application file for complete search history.

(56) References Cited

U.S. PATENT DOCUMENTS

| | | | |
|---|---|---|---|
| 6,623,659 B2 | 9/2003 | Munson et al. | |
| 6,849,774 B2 | 2/2005 | Boudreau et al. | |
| 2008/0146849 A1 | 6/2008 | Dai et al. | |
| 2009/0291874 A1* | 11/2009 | Bara et al. | 510/175 |
| 2010/0267596 A1* | 10/2010 | Degen et al. | 508/268 |

FOREIGN PATENT DOCUMENTS

KR    100831093 B1    5/2008

OTHER PUBLICATIONS

Weize Wu, et al; "Desulfurization of Flue Gas: $SO_2$ Absorption by an Ionic Liquid", Angew. Chem. Int. Ed. vol. 43, Issue 18; pp. 2415-2417; Article first published online Apr. 22, 2004.

Sung Yun Hong, et al; Ether-functionalized ionic liquids as highly efficient $SO_2$ absorbents:, Energy Environ. Sci. vol. 4, pp. 1802-1806; First published online 24 Mar. 2011.

(Continued)

*Primary Examiner* — Timothy Vanoy
(74) *Attorney, Agent, or Firm* — Ladas & Parry LLP

(57) ABSTRACT

Disclosed is an sorbent for removing sulfur dioxide ($SO_2$) contained in combustion flue gases or in the atmosphere by using a diamine-based ionic liquid or a diamine compound supported by a polymer resin. To be specific, the present invention relates to a method of using a tertiary diamine compound immobilized on a polymer surface as a $SO_2$ sorbent and also relates to a novel sorbent for absorbing or adsorbing a sulfur dioxide hydrate ($SO_2.H_2O$) formed by a bond between $SO_2$ and water.

8 Claims, 4 Drawing Sheets

LIQUID PHASE SEPARATION SO₂ ABSORPTION /DESORPTION PROCESS DIAGRAM

( ABSORPTION )

SOLID PHASE SEPARATION SO₂ ABSORPTION /DESORPTION PROCESS DIAGRAM

( ADSORPTION )

a) SO₂ ADSORPTION STAGE    b) SO₂ DESORPTION STAGE

(56) References Cited

OTHER PUBLICATIONS

Guokai Cui, et al; "Highly efficient $SO_2$ capture by dual functionalized ionic liquids through a combination of chemical and physical absorption", Chem. Commun. vol. 48, pp. 2633-2635; First published online Jan. 3, 2012.

Renpan Deng, et al; "Reversible absorption of $SO_2$ by amino acid aqueous solutions", Journal of Hazardous Materials, vol. 229-230, pp. 398-403, Available online Jun. 20, 2012.

\* cited by examiner

SO₂ ABSORPTION/DESORPTION APPARATUS

1. NITROGEN CYLINDER
2. SO₂ CYLINDER
3. Mass Flow Controller
4. VALVE
5. ABSORBENT VESSEL
6. Silicon Oil Bath
7. NaOH

LIQUID PHASE SEPARATION SO₂ ABSORPTION /DESORPTION PROCESS DIAGRAM

( ABSORPTION )

SOLID PHASE SEPARATION SO₂ ABSORPTION /DESORPTION PROCESS DIAGRAM

( ADSORPTION )

a) SO₂ ADSORPTION STAGE     b) SO₂ DESORPTION STAGE

SULFUR DIOXIDE AND/OR SULFUR DIOXIDE HYDRATE ABSORBENT

CROSS-REFERENCE TO RELATED APPLICATIONS

This application claims priority to and the benefit of Korean Patent Application No. 10-2013-0034594 filed Mar. 29, 2013, and Korean Patent Application No. 10-2013-0035431 filed Apr. 1, 2013, with the Korean Intellectual Property Office and the entire contents of which are incorporated herein by reference.

TECHNICAL FIELD

The present invention relates to an absorbent or adsorbent for removing sulfur dioxide ($SO_2$) and a sulfur dioxide hydrate ($SO_2.H_2O$) using a water-immiscible diamine-based ionic liquid or a tertiary amine compound supported by a polymer resin, and more particularly, to a method of using a quaternary amine-based hydrophobic ionic liquid having a tertiary amine group or an ionic liquid supported by a resin as a $SO_2$ sorbent and/or a $SO_2.H_2O$ sorbent and a process therefor.

BACKGROUND ART

For desulfurizing a power plant flue gas, there has been known a method of using lime (CaO) or limestone ($CaCO_3$). The use of these calcium compounds is advantageous in terms of cost but they entail a large amount of contaminated water as well as a low-value plaster as a product.

Amine compounds such as triethanolamine, monoethanolamine, diethanolamine, etc. also have been used as a $SO_2$ absorbent. However, a high regeneration temperature caused by a strong chemical bond between the amine and the sulfur dioxide results in irreversible decomposition of the amine. Furthermore, due to the vapor pressure of amine absorbents, regenerated $SO_2$ gas is frequently contaminated by the amine absorbents. Recently, as disclosed in U.S. Pat. No. 6,849,774 B2, U.S. Pat. No. 6,623,659 B2, and U.S. Patent Application Publication No. 2008/0146849 A1, methods of using an ionic liquid, which is non-volatile and has high thermal and chemical stability, have been attempted to overcome the disadvantages in the use of the conventional absorbents.

According to Angew. Chem., Int. Ed. (2004, 43, 2415-2417), 1,1,3,3-tetramethylguanidinium lactate ([TMG]L) could absorb 0.978 mol of $SO_2$ per mol of ionic liquid. Similarly, according to Korean Patent Application No. 10-2007-0034777, [BMIm]Cl could capture 1.68 mol per mol IL, while [EMIm]EtSO$_4$ could absorb 0.92 mol $SO_2$ per mol of ionic liquid.

Recently, in *Energy Environ. Sci.*, 4, 1802-1806 (2011) and *Chem. Commun.* 2633-2635 (2012), as a method for increasing $SO_2$ absorption capacity, ionic liquids having an ether functional cation and a tetrazolate anion are reported, respectively. These ionic liquids could capture more than 5 mol of $SO_2$ per mol of ionic liquid due to the presence of Lewis basic sites which could interact with Lewis acidic $SO_2$.

Meanwhile, flue gas contains water in the amount of 5 to 15% ionic liquid. In the presence of water, $SO_2$ exists as an hydrated form, $SO_2.H_2O$. The hydrated $SO_2$ is a strong acid $SO_2.H_2O$ as described below.

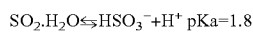

$SO_2.H_2O$ is much different from $SO_2$ in terms of chemical property. That is, $SO_2.H_2$ is not a Lewis acid but Bransted acid. Therefore, when $SO_2.H_2O$ solution is treated with amine, an ammonium bisulfite salt is produced. If the basicity of amine is high, regeneration of an absorbent is very difficult. Actually, J. Haz. Mat. 229-230 (2012) 398 describes a method for absorbing $SO_2$ by using an amino acid type absorbent dissovled in water and regenerating the absorbent. In the present disclosure, regeneration of the absorbent occurs at the temperature of 150° C. in which all water is evaporated together, thereby increasing regeneration energy.

SUMMARY OF THE INVENTION

The present invention has been made in an effort to provide a novel ionic liquid compound capable of absorbing $SO_2$ in an anhydrous condition and in a humid condition by using a $SO_2$ absorbent which does not mix with water and also capable of being easily separated from water before and after absorption since it does not mix with water.

An exemplary embodiment of the present invention uses a quaternary amine-structured compound having a tertiary amine group supported by a hydrophobic ionic liquid or a polymer to provide a $SO_2$ and $SO_2.H_2O$ absorbent.

The hydrophobic ionic liquid has a structure as expressed by [Formula 1] and a solid system has a structure as expressed by [Formula 2].

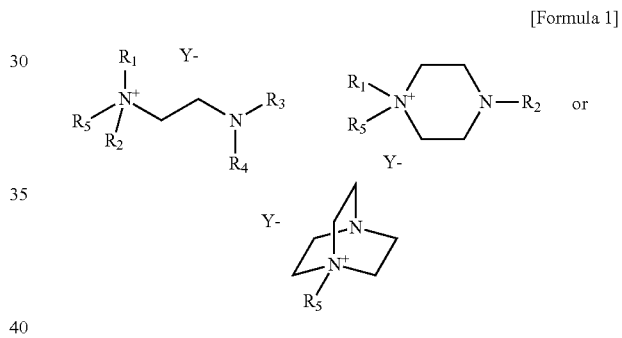

[Formula 1]

In Formula 1, $Y^-$ represents $(CF_3SO_2)_2N-$, $(CF_3CF_2SO_2)_2N-$, $CF_3SO_3-$, $CF_3CF_2CF_2CF_2SO_3-$, or $PF_6-$, and $R_1$ to $R_5$ respectively represent a $C_1$-$C_6$ alkyl group.

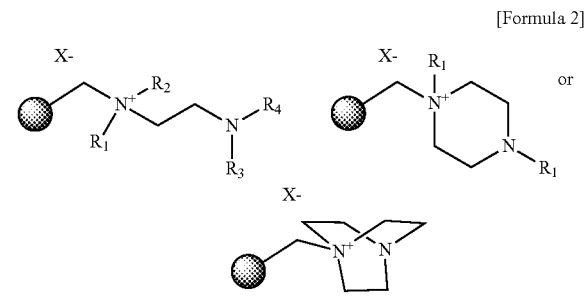

[Formula 2]

In Formula 2, $X^-$ represents $(CF_3SO_2)_2N-$, $(CF_3CF_2SO_2)_2N-$, $CF_3SO_3-$, $CF_3CF_2CF_2CF_2SO_3-$, $PF_6-$, $CH_3SO_3-$, or $Cl-$, and $R_1$ to $R_4$ respectively represent a $C_1$-$C_6$ alkyl group.

Another exemplary embodiment of the present invention provides a method for absorbing $SO_2$ or $SO_2.H_2O$ comprising absorbing $SO_2$ or $SO_2.H_2O$ using a quaternary amine-structured compound having a tertiary amine group supported by an ionic liquid which does not mix with water or a resin and expressed by Formula 1 and Formula 2.

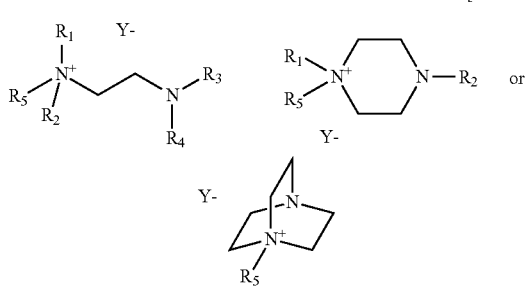

[Formula 1]

In Formula 1, Y⁻ represents $(CF_3SO_2)_2N-$, $(CF_3CF_2SO_2)_2N-$, $CF_3SO_3-$, $CF_3CF_2CF_2SO_3-$, or $PF_6-$, and $R_1$ to $R_5$ respectively represent a $C_1$-$C_6$ alkyl group.

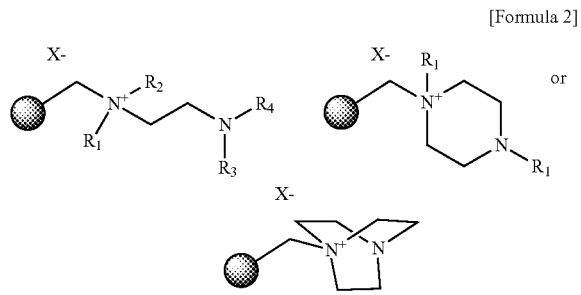

[Formula 2]

In Formula 2, X⁻ represents $(CF_3SO_2)_2N-$, $(CF_3CF_2SO_2)_2N-$, $CF_3SO_3-$, $CF_3CF_2CF_2SO_3-$, $PF_6-$, $CH_3SO_3-$, or $Cl-$, and $R_1$ to $R_4$ respectively represent a $C_1$-$C_6$ alkyl group.

If such an absorbent is used, $SO_2$ and water can be separated from a flue gas through a process configured as illustrated in FIG. 2.

According to exemplary embodiments of the present invention, a $SO_2$ absorbent of the present invention has a high $SO_2$ absorption capacity, and since the $SO_2$ absorbent does not mix with water, it is possible to remove $SO_2$ from a flue gas even in the presence of water. After SO2 absorption, the absorbent could be separated from the water and regenerated in the absence of water, which could save the energy for water evaporation. Further, it is easier to remove the absorbed $SO_2$, and even if repeatedly used, the absorbent can maintain an absorption capacity substantially the same as the initial level without loss of the absorbent. Furthermore, the $SO_2$ absorbent has an absorption power with pure $SO_2$ or hydrates of $SO_2$.

DETAILED DESCRIPTION

Figure 1:
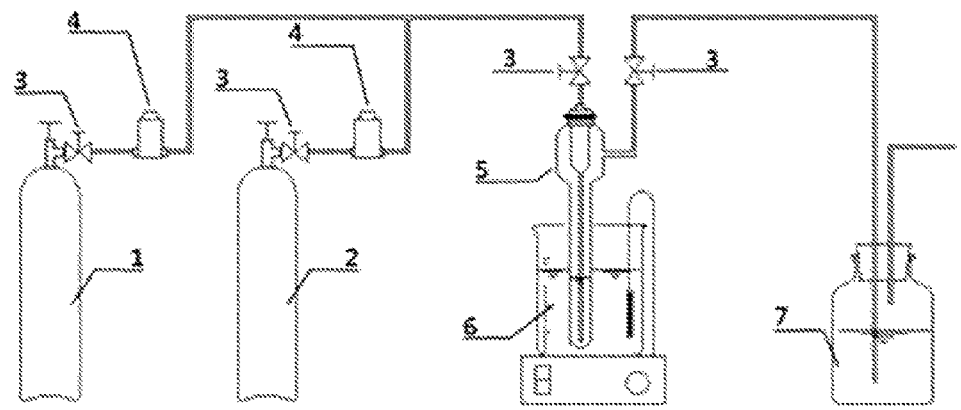
FIG. 1 is an exemplary view of a $SO_2$ absorption/desorption apparatus which can use a $SO_2$ and/or $SO_2.H_2O$ absorbent of the present invention.
Figure 2:
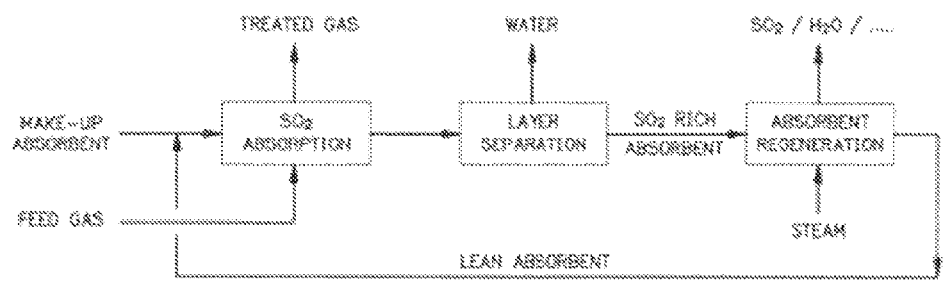
FIG. 2 is a process diagram applied to a flue gas desulfurization process. In the case of a liquid absorbent, a temperature of an absorption tower is maintained low, and a high-temperature flue gas introduced is cooled, whereby water in the flue gas is condensed simultaneously while $SO_2$ present in the flue gas is removed by the absorbent. Before and after the $SO_2$ is absorbed, the absorbent does not mix with the water, and thus a phase separation can be obtained. Then, the water is discharged and the $SO_2$ absorbent is regenerated in a regeneration tower and introduced again into the absorption tower. In the case of a solid absorbent, a temperature of the absorption tower is maintained to be lower than that of a flue gas introduced in the same manner as the liquid absorbent, whereby water in the flue gas is removed simultaneously while $SO_2$ in the flue gas is separated. Then, the accumulated water is separated, and if a $SO_2$ absorption capacity of the absorbent is saturated, the absorbent is regenerated by performing a process at high temperature.
Figure 2:
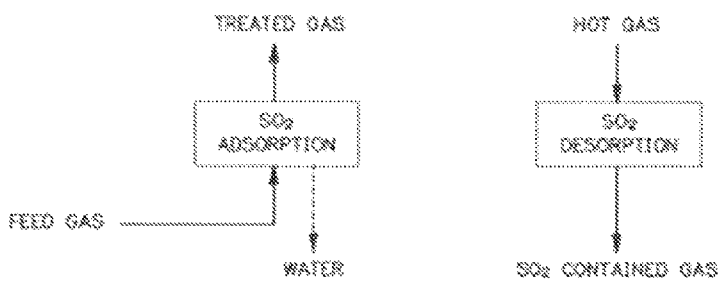
Figure 3:
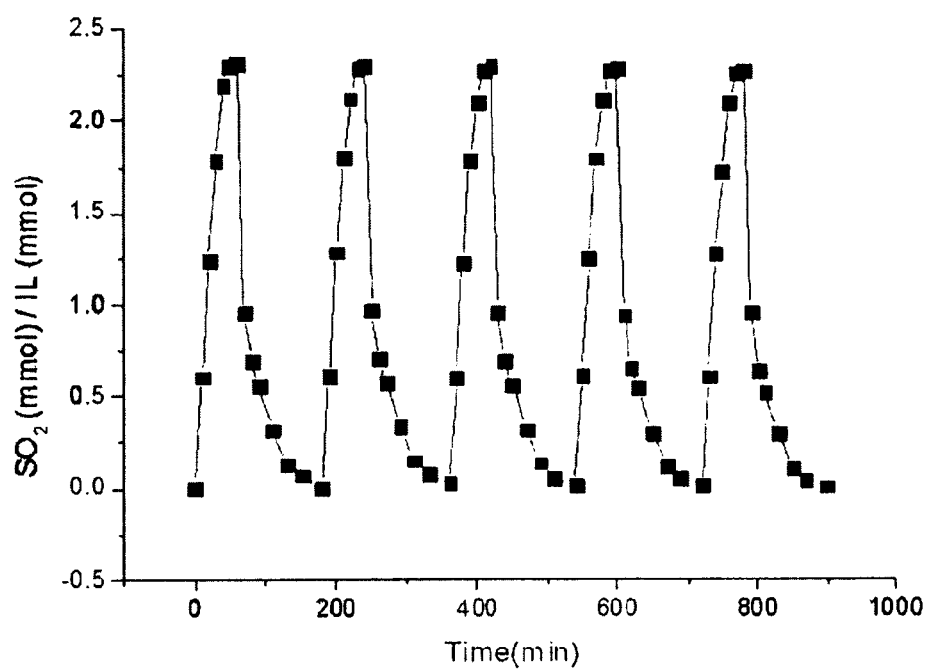
FIG. 3 is a graph of the absorption/desorption for Example 15.
Figure 4:
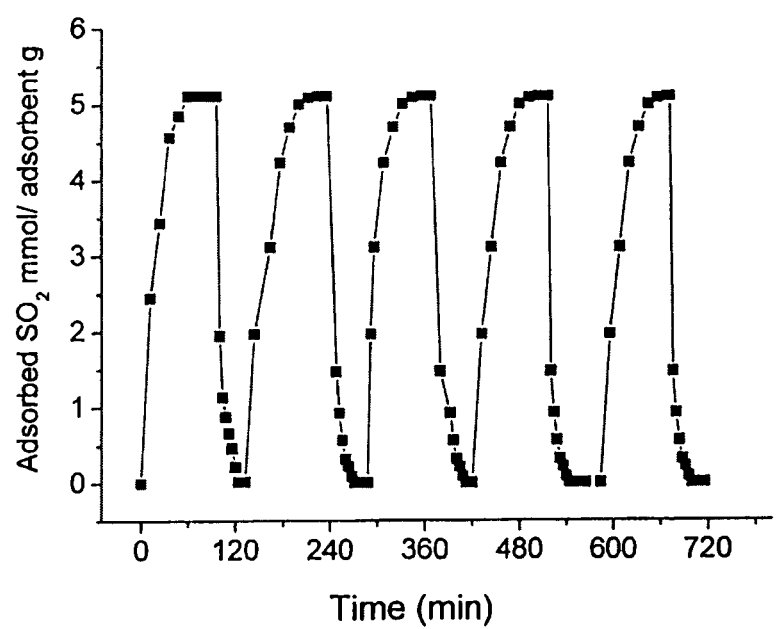
FIG. 4 is a graph of the absorption/desorption for Example 45.

As a result of close examination of problems of conventional amine-based absorbent and an absorption mechanism of sulfur dioxide, the present inventors found that $SO_2$ can be collected in an anhydrous condition or in a hydrous condition. $SO_2$ can be collected selectively under the condition of an excessive amount of $CO_2$ if an ionic liquid composed of a diamine-based cation and a hydrophobic anion or a polymer resin having diamine-based cation is used. More specifically, if an ionic liquid which can be prepared by an ion exchange reaction between an intermediate having a structure expressed by Formula 5 synthesized by using an amine compound having a structure expressed by [Formula 3] and alkyl halide having a structure expressed by [Formula 4] and a salt having a structure expressed by [Formula 6] is used or a polymer rein which can be prepared by synthesizing a diamine compound having a structure expressed by Formula 3 with a resin having a structure expressed by Formula 7 is used.

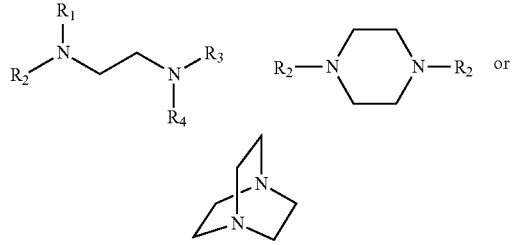

[Formula 3]

Herein, $R_1$ to $R_4$ represent a $C_1$-$C_6$ alkyl group.

$R_5-Cl$ [Formula 4]

In Formula 4, $R_5$ represents alkyl groups of $C_1$ to $C_2$.

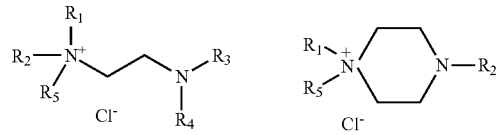

[Formula 5]

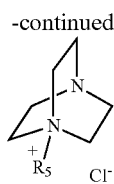

MY                                [Formula 6]

In Formula 6, M represents Li, K, or Na, and Y represents $(CF_3SO_2)_2N-$, $(CF_3CF_2SO_2)_2N-$, $CF_3SO_3-$, $CF_3CF_2CF_2CF_2SO_3-$, or $PF_6-$.

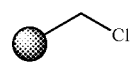 [Formula 7]

According to a method for removing $SO_2$ from a flue gas by using an absorbent of the present invention, $SO_2$ can be removed in a hydrous condition as well as in an anhydrous condition. When $SO_2$ is removed in an anhydrous condition, a tertiary amine of the absorbent can absorb the $SO_2$ through a physical interaction with the $SO_2$. In a hydrous condition, the $SO_2$ first reacts with water to be in the form of $SO_2.H_2O$ and then reacts with the tertiary amine group of the absorbent to have a structure of $[R_3NH^+][HSO_3^-]$. In this case, if the absorbent of the present invention is used, $[R_3NH^+][HSO_3^-]$ is not dissolved in the water and thus can be easily separated from the water. Further, by heating the separated salt at a temperature of 80 to 100° C. or higher, the liquid absorbent can be regenerated at a relatively low temperature.

Further, if the absorbent is used, $SO_2$ and water in a flue gas can be removed at the same time. If the water contained in the amount of 5 to 15% in the flue gas is continuously introduced into a $CO_2$ absorbent, a concentration of the liquid $CO_2$ absorbent is changed. Further, while the liquid $CO_2$ absorbent is regenerated, a boiling temperature of the water is lower than a regeneration temperature, thus, a large amount of energy is consumed during a $CO_2$ absorption-regeneration process. Therefore, before $CO_2$ is removed, the flue gas is cooled to separate water from the flue gas. In this case, while the water is separated, $SO_2$ can also be separated by using the absorbent of the present invention.

The process for removing $SO_2$ using the absorbent of the present invention consumes much less energy as compared with a high-temperature stripping process required for collecting $SO_2$ with an amine absorbent. This is because it is much easier to remove $SO_2$ from an ionic liquid absorbed $SO_2$ through a physical interaction rather than removing $SO_2$ from primary and secondary amine absorbed $SO_2$ by a chemical bonding. In particular, tertiary amine having a quaternary amine group has a much lower basicity as compared with general tertiary amines, thereby having a lower strength of interaction with $SO_2$, resulting in a relatively low regeneration temperature. When removing $SO_2$ in water environment, $[R_3NH^+][HSO_3^-]$ generated which is a combination of a weak base and a strong acid. Accordingly, regeneration of $[R_3NH^+][HSO_3^-]$ to $R_3N$ and $SO_2.H_2O$ may occur at a relatively low temperature.

If $SO_2$ is absorbed by using the absorbent of the present invention, a temperature may be in a range of 20 to 80° C., and desirably, 30 to 50° C. If an absorption temperature is 20° C. or lower, $SO_2$ can be present in the form of a liquid, whereas if an absorption temperature is 50° C. or higher, absorption and desorption can be carried out at the same time and $SO_2$ absorption efficiency can be decreased. Desirably, an absorption pressure may be in a range of normal pressure to 3 atm. considering a vapor pressure (3.44 atm. at 21° C.) of the $SO_2$. A desorption temperature may be in a range of 50 to 150° C., and desirably, 70 to 150° C. If a desorption temperature is 50° C. or lower, a desorption rate is decreased, whereas if a desorption temperature is 150° C. or higher, an ionic liquid can be degraded. Thus, the desorption temperature needs to be maintained in the above range. When $SO_2$ is absorbed, an amount of $SO_2$ absorbed is increased with increasing $SO_2$ pressure and decreasing absorption temperature. However, in most flue gases desulfurization processes, $SO_2$ partial pressure is not high. Therefore, it is desirable to use an ionic liquid having a high $SO_2$ absorption power at a low pressure. Further, a method for removing $SO_2.H_2O$ from an aqueous solution can be carried out regardless of a temperature. A desorption temperature may be appropriate in a range of 80 to 150° C.

The absorbent of the present invention will be explained in detail with reference to Examples below. However, it should be noted that the scope of the present invention is not limited thereto.

EXAMPLE 1

Synthesis of an Ionic Liquid

Tetraethylethylenediamine and butylchloride (1:1.2 molar ratio) were $CH_3CN$ reacted at 90° C. for 24 h. After the reaction, the remaining butylchloride and solvent were removed by using a rotary evaporator. The remaining chloride-based ionic liquid was dissolved in $CH_2Cl_2$ and an equivalent salt $Li(CF_3SO_2)N$ was added thereto and reacted at room temperature for 12 h. A produced mixture of N—(N', N'-diethylamino)ethyl-N,N-diethyl-N-butylammonium bistrifluoromethylsulfonyl imide-LiCl was washed with water to remove LiCl. Then, the remaining water was removed by using $MgSO_4$ and the solvent was evacuated to obtained a product (refer to Reaction Formula 1).

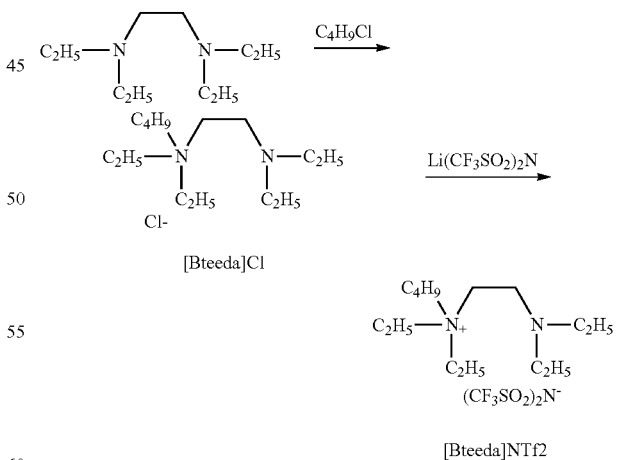

An absorption reactor R1 of FIG. 1 was filled with 10 g of N—(N',N'-diethylamino)ethyl-N,N-diethyl-N-butylammonium bistrifluoromethylsulfonyl imide ([Bteeda]Ntf2) as an ionic liquid, while a temperature was maintained at 30° C. $SO_2$ absorption experiment was carried out by flowing $SO_2$ at a rate of 20 cc/min using a mass flow controller. An increase in weight over purging time was measured. When there was no further increase in weight, it was determined as a $SO_2$ capacity at that absorption condition. In this ionic liquid, 2.5 mol of $SO_2$ was absorbed by 1 mol of the ionic liquid.

EXAMPLES 2 TO 6

Examples 2 to 6 were carried out in the same manner as Example 1. In order to find out the effect of a cation of an ionic liquid on absorption of $SO_2$, an anion was fixed as bistrifluoromethylsulfonyl imide (($CF_3SO_2$)$_2$N) and then an amount of $SO_2$ absorbed was measured. A result of the measurement was as listed in Table 1.

TABLE 1

| Example | Ionic liquid (IL) | Amount of $SO_2$ absorbed (gmole $SO_2$/gmole IL) |
|---|---|---|
| 1 | [BTeeda]NTf2 | 2.5 |
| 2 | [Pmeda]NTf2 | 2.7 |
| 3 | [Mtueda]NTf2 | 2.3 |
| 4 | [Dtmeda]NTf2 | 2.3 |
| 5 | [Edmpip]Ntf2 | 2.5 |
| 6 | [Hdabco]Ntf2 | 2.6 |

EXAMPLES 7 TO 10

Examples 7 to 10 were carried out in order to find out the effect of an anion in ionic liquids in the same manner as Example 2. The cation was fixed as N—(N',N'-dimethylamino)ethyl-N,N-dimethyl-N-butylammonium ([Btmeda]+) and the results are listed in Table 2.

TABLE 2

| Example | Ionic liquid (IL) | Amount of $SO_2$ absorbed (gmole $SO_2$/gmole IL) |
|---|---|---|
| 7 | [Btmeda]CF3SO3 | 2.7 |
| 8 | [Btmeda]C4F9SO3 | 2.3 |
| 9 | [Btmeda]PF6 | 2.3 |
| 10 | [Btmeda]BETI | 2.5 |

EXAMPLES 11 TO 14

By using N—(N',N'-dimethylamino)methyl-N,N-diethyl-N-butylammonium bistrifluoromethylsulfonyl imide as an ionic liquid and fixing an absorption pressure to 1 atm. and varying an absorption temperature as listed in Table 3, $SO_2$ absorption capacities were measured in the same manner as Example 1. Results of the experiments were as listed in Table 3.

EXAMPLE 15

TABLE 3

| Example | Absorption temperature (° C.) | Amount of $SO_2$ absorbed (gmole $SO_2$/gmole IL) |
|---|---|---|
| 11 | 20 | 2.9 |
| 12 | 40 | 1.9 |
| 13 | 50 | 1.6 |
| 14 | 60 | 1.0 |

By fixing an absorption temperature to 30° C. and an absorption pressure to 1 atm., $SO_2$ absorption capacity was measured in the same manner as Example 1. Then, while a temperature of a liquid absorbent was maintained at 80° C., nitrogen was purged at 10 mL/min to remove $SO_2$. The absorption/desorption cycle was repeated four times in the same condition, and a tendency of absorption/desorption was as follows.

EXAMPLES 16 TO 21

The absorption of SO2 in the presence of water was measured in the same manner as Example 1, except the same amount of water was added to the ionic liquids before SO2 purging. To obtain the SO2 absorption capacity in the presence of water, SO2 absorption amount by water was subtracted from the total weight increase. The Results are as listed in Table 4.

TABLE 4

| Example | Ionic liquid (IL) | Amount of $SO_2 \cdot H_2O$ absorbed (gmole $SO_2$/gmole IL) |
|---|---|---|
| 16 | 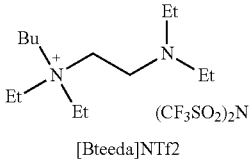 [Bteeda]NTf2 | 1.28 |
| 17 | 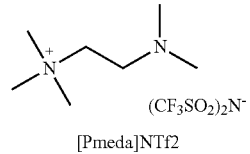 [Pmeda]NTf2 | 1.35 |
| 18 | 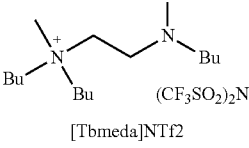 [Tbmeda]NTf2 | 0.97 1.38 |
| 19 | 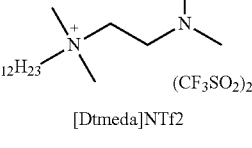 [Dtmeda]NTf2 | 0.98 1.20 |
| 20 | 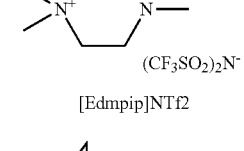 [Edmpip]NTf2 | 0.97 1.43 |
| 21 | 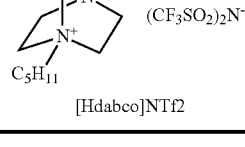 [Hdabco]NTf2 | 0.99 1.20 |

EXAMPLES 22 TO 26

After SO2 absorption in the presence of water using the ionic liquid of Example 20, water was decanted and the ionic liquid-$SO_2$ was heated to 100° C. with a nitrogen purge (10 mL/min) so as to regenerated absorbent. The absorption/desorption experiment was repeated 5 in the same condition and the results of the comparisons are as listed in Table 5.

TABLE 5

| Example | 22 | 23 | 24 | 25 | 26 |
|---|---|---|---|---|---|
| Number of reuse | One time | Two times | Three times | Four times | Five times |
| Amount of absorption (gmole $SO_2$/gmole IL) | 1.41 | 0.95 1.38 | 0.97 1.38 | 0.96 1.32 | 1.33 |

COMPARATIVE EXAMPLE 11

In the same reaction as Example 1, instead of $SO_2$, $CO_2$ was introduced for 3 h. After $CO_2$ purging, no increase in weight was measured, indicating no $CO_2$ was absorbed by the ionic liquid.

PREPARATION EXAMPLE 1

Synthesize of an Absorbent

Merrifield resin having a Cl content of 30 mmol/g was reacted with a mixture of 5 mmol of tetramethylethylendiamine in a solvent $CH_3CN$ at 90° C. for 24 h (refer to Reaction Formula below). After the reaction, the resin was filtered and washed with $CH_3CN$ and dried under vacuum.

After the reaction, CHN analysis was conducted and found more than 98% of benzyl chloride site in merrifield resin were substituted by amine.

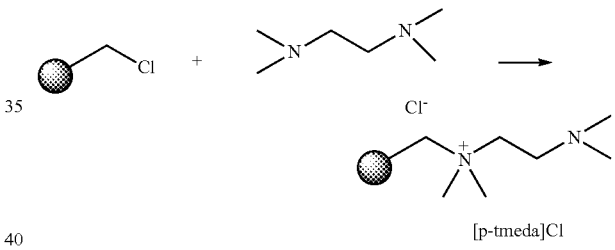

[p-tmeda]Cl

EXAMPLE 27

Experiment of Absorbing $SO_2$

An adsorption reactor R1 of FIG. 1 was filled with 10 g of a solid synthesized in Preparation Example 1, and while a temperature of a thermostat was maintained at 30° C., an $SO_2$ adsorption capacity was measured. By flowing $SO_2$ at a rate of 20 cc/min using a mass flow controller, an increase in weight over time was monitored. When there was no further increase in weight, it was determined as a $SO_2$ capacity at that absorption condition and 8.05 mol of $SO_2$ was absorbed by 1 g of the absorbent.

EXAMPLE 28

Synthesis of Adsorbent Including Methanesulfonate Anion

A chloride-based absorbent synthesized in Preparation Example 1 was reacted with 3 equivalents of $CH_3SO_3Na$ in water to exchange $Cl^-$ with $CH_3SO_3^-$. A solid produced after the reaction was filtered, washed with methanol and vacuum dried. CHN analysis revealed all chloride was substituted by $CH_3SO_3$.

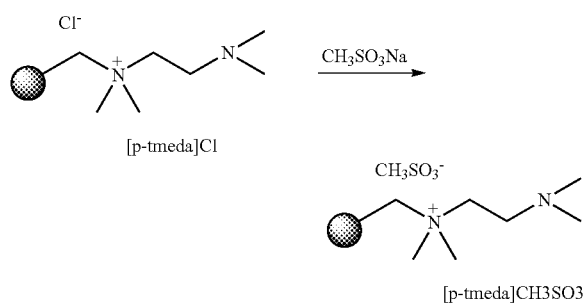

EXAMPLE 29

SO$_2$ adsorption experiment was carried out by using an synthesized resin in Example 28 in the same manner as Example 27 It was found that 5.0 mmol of SO$_2$ was adsorbed by 1 g of the adsorbent.

EXAMPLES 30 TO 34

SO$_2$ adsorption capacities of amine-functional polymer resins having CH$_3$SO$_3$ anion prepared in the same manner as Example 28 were measured in the same manner as Example 27. Results of the measurements were listed in Table 6.

TABLE 6

| Example | Ionic liquid (IL) | Amount of SO$_2$ absorbed (gmole SO$_2$/gmole IL) |
|---|---|---|
| 30 | (CF$_3$SO$_2$)$_2$N$^-$ [p-tmeda]NTf2 | 4.2 |
| 31 | CF$_3$SO$_3^-$ [p-tmeda]CF3SO3 | 4.8 |
| 32 | CF$_3$CO$_2^-$ [p-tmeda]CF3CO2 | 4.7 |
| 33 | HSO$_3^-$ [p-tmeda]HSO3 | 5.1 |
| 34 | HSO$_4^-$ [p-tmeda]HSO4 | 5.3 |

EXAMPLES 35 TO 40

Examples 35 to 40 were carried out in the same manner as Preparation Example 1 and Example 28, but adsorbents were synthesized by using various amine compounds and their SO$_2$ adsorption capacity was measured. Results of the measurements were as listed in Table 7.

TABLE 7

| Example | Ionic liquid (IL) | Amount of SO$_2$ absorbed (gmole SO$_2$/gmole IL) |
|---|---|---|
| 35 | CH$_3$SO$_3^-$ [p-pmdeta]CH3SO3 | 4.3 |
| 36 | CH$_3$SO$_3^-$ [p-hmteta]CH3SO3 | 4.2 |
| 37 | CH$_3$SO$_3^-$ [p-teeda]CH3SO3 | 3.8 |

TABLE 7-continued

| Example | Ionic liquid (IL) | Amount of SO$_2$ absorbed (gmole SO$_2$/gmole IL) |
|---|---|---|
| 38 | 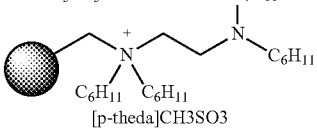 [p-theda]CH3SO3 | 3.8 |
| 39 | 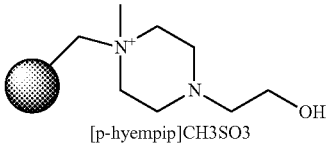 [p-hyempip]CH3SO3 | 6.0 |
| 40 | 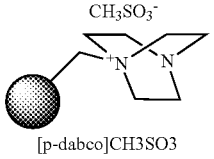 [p-dabco]CH3SO3 | 3.9 |

EXAMPLES 41 TO 44

By using an absorbent synthesized in Example 28 and fixing an absorption pressure to 1 atm. and varying an absorption temperature as listed in Table 8, SO$_2$ adsorption capacities were measured in the same manner as Example 28. Results of the experiments were as listed in Table 8.

TABLE 8

| Example | Absorption temperature (° C.) | Amount of SO$_2$ absorbed (mmole SO$_2$/g absorbent) |
|---|---|---|
| 41 | 20 | 6.2 |
| 42 | 40 | 4.3 |
| 43 | 50 | 3.8 |
| 44 | 60 | 2.5 |

EXAMPLE 45

By fixing an adsorption temperature to 30° C. and an adsorption pressure to 1 atm. and using an adsorbent synthesized in Example 28, SO$_2$ adsorption capacity was measured. Then, while a temperature of the adsorbent was maintained at 80° C., nitrogen was purged at 10 mL/min to remove SO$_2$. The adsorption/desorption experiment was repeated 5 times in the same condition and the results of the comparisons were as follows.

EXAMPLE 46

The adsorption capacity of SO$_2$ using amine-functional polymer resin of Example 28 in the presence of water was measured in the same manner as Example 1, except the same amount of water was added to the resin before SO2 purging. To obtain the SO$_2$ adsorption capacity in the presence of water, SO$_2$ absorption amount by water was subtracted from the total weight increase. The amount of SO$_2$ adsorption by a novel compound synthesized by the method of Example 28 was measured as 2.0 mmol/g.

TABLE 4

| Example | Structure of absorbent | Amount of SO$_2$•H$_2$O absorbed (mmole SO$_2$/g absorbent) |
|---|---|---|
| 47 | 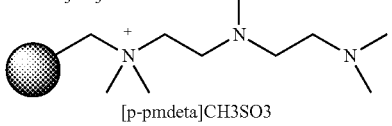 [p-pmdeta]CH3SO3 | 2.8 |
| 48 | 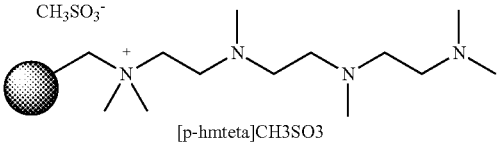 [p-hmteta]CH3SO3 | 3.1 |

TABLE 4-continued

| Example | Structure of absorbent | Amount of $SO_2 \cdot H_2O$ absorbed (mmole $SO_2$/g absorbent) |
|---|---|---|
| 49 | [p-teeda]CH3SO3 | 2.2 |
| 50 | [p-theda]CH3SO3 | 2.1 |
| 51 | [p-hempip]CH3SO3 | 2.5 |
| 52 | [p-dabco]CH3SO3 | 2.2 |

EXAMPLES 53 TO 57

After $SO_2$ adsorption in the presence of water using the polymer resin of Example 51, water was decanted and the resin-SO2 was heated to 80° C. under vacuum (0.1 torr) so as to regenerated absorbent. The adsorption/desorption experiment was repeated 5 times in the same condition and the results of the comparisons were as listed in Table 5.

While a temperature of a salt of $SO_2.H_2O$ as an absorbent of Example 39 was maintained at 80° C., water and $SO_2$ were removed under a depressurized condition of 0.1 Torr. If the primary absorption and removal of $SO_2$ was ended, absorption and removal was carried out five times in the same condition. As a result, a change in adsorption capacity was observed as listed below.

| Example | 53 | 54 | 55 | 56 | 57 |
|---|---|---|---|---|---|
| Number of reuse | One time | Two times | Three times | Four times | Five times |
| Amount of absorption | 2.1 | 2.2 | 2.0 | 2.2 | 2.1 |

COMPARATIVE EXAMPLE 2

In the same reaction as Example 27, instead of $SO_2$, $CO_2$ was introduced for 3 h and an amount of $CO_2$ absorbed was measured. There was no increase in the weight of sample, indicating the resin did not adsorb any $CO_2$.

What is claimed is:

1. A $SO_2$ and/or $SO_2.H_2O$ absorbent comprising a quaternary amine-based hydrophobic ionic liquid having a tertiary amine group and expressed by Formula 1:

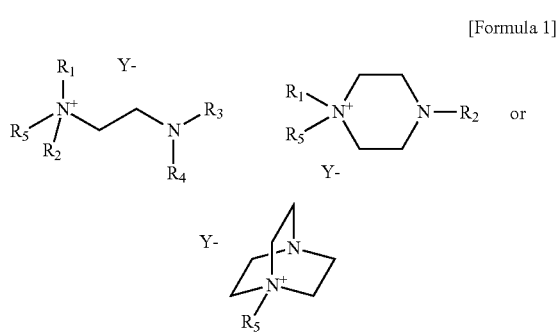

[Formula 1]

Wherein, in Formula 1, $Y^-$ represents $(CF_3SO_2)_2N—$, $(CF_3CF_2SO_2)_2N—$, $CF_3SO_3—$, $CF_3CF_2CF_2CF_2SO_3—$, or $PF_6—$, and $R_1$ to $R_5$ respectively represent a $C_1$-$C_6$ alkyl group.

2. A $SO_2$ and/or $SO_2.H_2O$ adsorbent comprising a product of a reaction between a polymer resin and tertiary amine expressed by Formula 2:

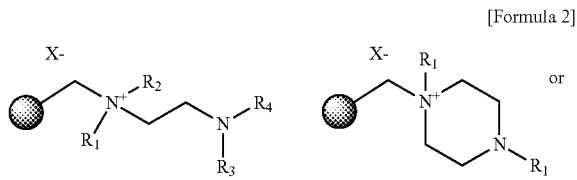

[Formula 2]

-continued

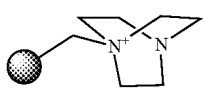

Wherein, in Formula 2, X⁻ represents $(CF_3SO_2)_2N-$, $(CF_3CF_2SO_2)_2N-$, $CF_3SO_3-$, $CF_3CF_2CF_2CF_2SO_3-$, $PF_6-$, $CH_3SO_3-$, or $Cl-$, and $R_1$ to $R_4$ respectively represent a $C_1$-$C_6$ alkyl group.

3. A method for absorbing $SO_2$ and/or $SO_2 \cdot H_2O$ by using a quaternary amine-based hydrophobic ionic liquid having a tertiary amine group and expressed by Formula 1:

[Formula 1]

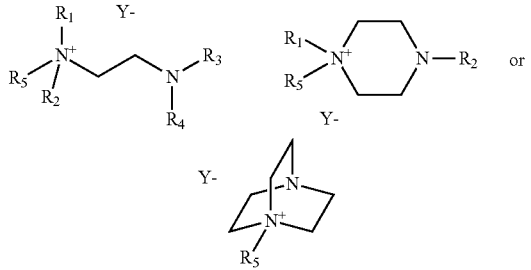

Wherein, in Formula 1, Y⁻ represents $(CF_3SO_2)_2N-$, $(CF_3CF_2SO_2)_2N-$, $CF_3SO_3-$, $CF_3CF_2CF_2CF_2SO_3-$, or $PF_6-$, and $R_1$ to $R_5$ respectively represent a $C_1$-$C_6$ alkyl group.

4. A method for adsorbing $SO_2$ and/or $SO_2 \cdot H_2O$ by using a product of a reaction between a polymer resin and tertiary amine supported by a resin and expressed by Formula 2:

[Formula 2]

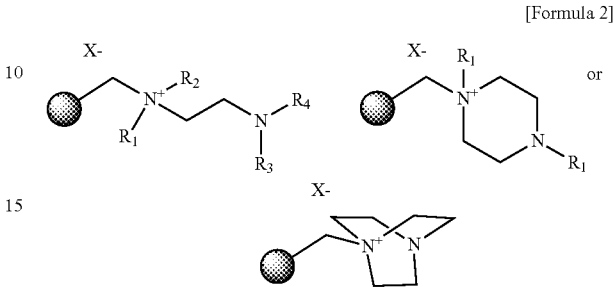

Wherein, in Formula 2, X⁻ represents $(CF_3SO_2)_2N-$, $(CF_3CF_2SO_2)_2N-$, $CF_3SO_3-$, $CF_3CF_2CF_2CF_2SO_3-$, $PF_6-$, $CH_3SO_3-$, or $Cl-$, and $R_1$ to $R_4$, respectively represent a $C_1$-$C_6$ alkyl group.

5. The method of claim 3 or 4, wherein a $SO_2$ absorption temperature is 10 to 100° C.

6. The method of claim 3 or 4, wherein a $SO_2 \cdot H_2O$ absorption temperature is room temperature.

7. The method of claim 3 or 4, wherein a $SO_2$ removal temperature is 50 to 150° C.

8. The method of claim 3 or 4, wherein a $SO_2 \cdot H_2O$ removal temperature is 80 to 120° C.

* * * * *